(12) United States Patent  
Arzt et al.

(10) Patent No.: US 11,655,396 B2
(45) Date of Patent: May 23, 2023

(54) DOUBLE-SIDED REVERSIBLE ADHESIVE STRUCTURE

(71) Applicant: Leibniz-Institut für Neue Materialien gemeinnützige GmbH, Saarbrücken (DE)

(72) Inventors: Eduard Arzt, Saarbrücken (DE); René Hensel, Saarbrücken (DE); Karsten Moh, Blieskastel-Brenschelbach (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 319 days.

(21) Appl. No.: 16/772,221

(22) PCT Filed: Dec. 14, 2018

(86) PCT No.: PCT/EP2018/084960
§ 371 (c)(1),
(2) Date: Jun. 12, 2020

(87) PCT Pub. No.: WO2019/129508
PCT Pub. Date: Jul. 4, 2019

(65) Prior Publication Data
US 2021/0071045 A1 Mar. 11, 2021

(30) Foreign Application Priority Data

Dec. 27, 2017 (DE) .................... 10 2017 131 345.1

(51) Int. Cl.
*C09J 9/00* (2006.01)
*B32B 7/14* (2006.01)
(Continued)

(52) U.S. Cl.
CPC .................. *C09J 9/00* (2013.01); *B32B 7/14* (2013.01); *B32B 17/10036* (2013.01);
(Continued)

(58) Field of Classification Search
CPC .......... B32B 17/0036; B32B 17/10688; B32B 37/1284; B32B 7/06; B32B 7/08;
(Continued)

(56) References Cited

U.S. PATENT DOCUMENTS 6,541,098 B2 * 4/2003 Venkatasanthanam ... B32B 3/28
428/161
8,398,909 B1 3/2013 Sitti et al.
(Continued)

FOREIGN PATENT DOCUMENTS

CN 103459529 A 12/2013
CN 107110185 A 8/2017
(Continued)

OTHER PUBLICATIONS

Wang, Zhengzhi et al., "A gecko-inspired double-sided adhesive," 2013, Physical Chemistry Chemical Physics, Royal Society of Chemistry Publishing, vol. 15, pp. 20764-20770. (Year: 2013).*
(Continued)

*Primary Examiner* — Philip C Tucker
*Assistant Examiner* — Brian R Slawski
(74) *Attorney, Agent, or Firm* — Cahn & Samuels, LLP

(57) ABSTRACT

An object includes at least two faces which are suitable for dry adhesion and differ in their adhesion parameters. By suitable structuring, it is possible, where appropriate in combination with a suitable contact pressure, to selectively control the detachment of surfaces contacted on these faces.

16 Claims, 6 Drawing Sheets

(51) Int. Cl.
B32B 17/10 (2006.01)
B32B 37/12 (2006.01)

(52) U.S. Cl.
CPC .... B32B 17/10688 (2013.01); B32B 37/1284 (2013.01); *C09J 2301/1242* (2020.08); *C09J 2301/31* (2020.08)

(58) Field of Classification Search
CPC ..... B32B 7/10; B32B 7/14; B32B 2037/0092; C09J 2301/1242; C09J 2301/31; C09J 2301/312; C09J 9/00
USPC ....... 156/60, 61, 71, 72, 242, 245, 247, 292, 156/297, 299, 701, 714, 718; 264/243; 428/99, 119, 212, 218, 220, 98, 221, 337, 428/339, 343
See application file for complete search history.

(56) References Cited

U.S. PATENT DOCUMENTS

| | | | |
|---|---|---|---|
| 10,351,733 | B2 | 7/2019 | Hensel et al. |
| 10,390,997 | B2 | 8/2019 | Tuma |
| 11,096,771 | B2 | 8/2021 | Arzt et al. |
| 2005/0148984 | A1 | 6/2005 | Lindsay et al. |
| 2005/0151385 | A1 | 7/2005 | Autumn et al. |
| 2006/0003307 | A1 | 1/2006 | Hester et al. |
| 2008/0280085 | A1 | 11/2008 | Livne et al. |
| 2008/0292848 | A1* | 11/2008 | Xie ............ C09J 5/06 428/188 |
| 2010/0021647 | A1 | 1/2010 | Sitti et al. |
| 2010/0080951 | A1* | 4/2010 | Del Campo Becares ............ B81C 1/00206 264/340 |
| 2012/0052234 | A1 | 3/2012 | Natarajan et al. |
| 2012/0143228 | A1 | 6/2012 | Natarajan et al. |
| 2012/0319320 | A1* | 12/2012 | Sitti ............ C09J 7/20 264/129 |
| 2013/0299078 | A1 | 11/2013 | Sharma et al. |
| 2015/0141895 | A1* | 5/2015 | Tuma ............ A61F 13/00025 602/43 |
| 2016/0312079 | A1 | 10/2016 | Sato et al. |
| 2018/0223886 | A1 | 8/2018 | Kroner et al. |
| 2021/0062839 | A1 | 3/2021 | Arzt et al. |
| 2021/0071046 | A1 | 3/2021 | Arzt et al. |

FOREIGN PATENT DOCUMENTS

| | | |
|---|---|---|
| JP | 2008201883 A | 9/2008 |
| JP | 2013536729 A | 9/2013 |
| JP | 2015502436 A | 1/2015 |
| JP | 2015519961 A | 7/2015 |
| JP | 2016204659 A | 12/2016 |
| WO | 2021094215 A1 | 5/2021 |

OTHER PUBLICATIONS

Wang, Zhengzhi et al. "Gecko-inspired bidirectional double-sided adhesives," 2014, Soft Matter, 10, 3301-3310. (Year: 2014).*
Fenn, Julia. "Making it stick," 2013, ROM Magazine, 33. (Year: 2013).*
WIPO International Preliminary Report on Patentability for Application No. PCT/EP2018/084960, dated Jul. 2020.
English Abstract of WO2021094215A1, May 20 2021.
Greiner, C. et al., "Adhesion of Bioinspired Micropatterned Surfaces: Effects of Pillar Radius, Aspect Ratio, and Preload," Langmuir, 23, 2007, 3495-3502.
Paretkar, D. et al., "Preload-Responsive Adhesion: Effects of Ratio, Tip Shape and Alignment," J.R. Soc. Interface, 10, 2013, 1-13.
Broermann, K. et al., Friction on a Microstructured Elastomer Surface, Tribol. Lett., 50, 2013, 3-15.
Wang, Z. et al., "A Gecko-Inspired Double-Sided Adhesive," Phys. Chem. Chem. Phys., 15, 2013, 20764-20770.
International Search Report for Application No. PCT/EP2018/084960, dated Apr. 2019.
International Written Opinion Report for Application No. PCT/EP2018/084960, dated Apr. 2019.
English Abstract for CN103459529 A, Dec. 18, 2013.
English Abstract for CN107110185 A, Aug. 29, 2017.
English abstract for JP2016204659A, printed on Dec. 8, 2016.
English abstract for JP2008201883A, printed on Sep. 4, 2008.

* cited by examiner

Example 1: $L_1 \neq L_2$

Example 2: $D_1 \neq D_2$

Example 3: $E_1 \neq E_2$

DOUBLE-SIDED REVERSIBLE ADHESIVE STRUCTURE

This patent application is a U.S. national stage application of PCT international application PCT/EP2018/084960 filed on 14 Dec. 2018 and claims priority of German patent document 10 2017 131 345.1 filed on 27 Dec. 2017, the entireties of which are incorporated herein by reference.

FIELD OF THE INVENTION

The invention relates to an object having at least two surfaces which each have at least one face capable of dry adhesion, and to a method for switchable adhesion with such objects.

BACKGROUND AND SUMMARY OF THE INVENTION

The molecular adhesion between two objects can be reinforced or controlled by fiber-like surface structures. This principle is known as the Gecko effect. If a structured elastomer surface is pressed with a certain pressing-on force against a comparatively flat surface, van der Waals interactions can take place. Reversible adhesion, that is to say the possibility of switching attachment and detachment in a targeted manner is also known from nature. Whereas, however, the Gecko achieves detachment by a "peeling" of its *setae*, this is frequently not possible for technical structures and usually only expedient when shear adhesion, that is to say adhesion in the direction of the substrate surface/object surface, is intended to be used. In the case of so-called normal adhesion, that is to say an adhesive force perpendicular to the object surface, detachment has to be initiated in some other way.

Here, the strength of the adhesion and also the manner of detachment can be controlled by the structure of the dry adhesive structure on the surface. By contrast to normal adhesive bonds, this allows targeted control of the adhesion forces.

Such structures can provide advantages precisely for applications in which objects have to be reversibly fastened to certain surfaces.

When using column-shaped adhesive structures, that is to say structures which consist of a multiplicity of column-shaped projections whose end faces form the contact area for attachment to a surface, detachment is triggered as a rule by virtue of the fact that the contact area to the surface is reduced by external influences.

It is known that the reduction in the contact area can be brought about by buckling of projections under compressive loading. Given sufficient compressive loading, elastic instability leads to the buckling of the projections. This is also referred to as Euler buckling. The critical force is:

$$F=(n\pi/L)^2 EI$$

Here, E is the modulus of elasticity, I is the area moment of inertia, L is the length (height) of the projection, and n is a preliminary factor in dependence on the mechanical clamping in of the projection. The area moment of inertia in a cylindrical structure is $I=\pi d^4/64$. This results in the following relationship: projections with a large height, small diameter or small modulus of elasticity buckle under smaller forces than projections with a short length, large diameter or high modulus of elasticity.

It is precisely when handling small objects that conventional holding devices reach their limits.

Problem

The problem addressed by the invention is to provide a structure which allows the selective handling of objects, in particular the targeted detachment.

Solution

This problem is solved by the inventions having the features of the independent claims. Advantageous developments of the inventions are characterized in the dependent claims. The wording of all claims is hereby incorporated by reference in the content of this description. The inventions also comprise all expedient and in particular all mentioned combinations of independent and/or dependent claims.

The problem is solved by an object which has, at least on two surfaces, in each case a face capable of dry adhesion, wherein the two faces differ in at least one adhesion parameter.

Preference is given to faces whose adhesion is based on normal adhesion. These are in particular faces having structures which are based on perpendicular projections.

At least one of the faces preferably has a structure comprising perpendicular projections. With particular preference, both faces have structures comprising perpendicular projections.

The faces for dry adhesion are preferably arranged on different sides of the object. A preferred arrangement is one such that, corresponding to the use, each of the faces can be individually contacted. In particular, at least two of the faces are arranged on different lateral faces of the object. Here, the two faces can be situated opposite one another in parallel or have an angle. In the case of an angle, it is preferably an acute angle below 60°, in particular below 30°. Lateral faces which are parallel to one another are preferred. The faces can also be concavely or convexly curved. This can be varied corresponding to the application.

What is to be understood by adhesive parameter is not only the adhesive force caused by the structure but also the force to be applied to detach the structure. Thus, for example, structures can be able to be detached by Euler buckling under different conditions. Euler buckling results in the fact that, by virtue of the compression of the structure under high contact pressure, the adhesion force is reduced and the structure releases from the surface under smaller tensile force. Such a structure therefore has two different adhesive forces depending on the contact pressure. If the contact pressure for Euler buckling is not exceeded, the adhesive force is generally high, that is to say the surface adheres firmly to the structure. If the contact pressure exceeds the value for Euler buckling, the adhesive force of the structure is considerably reduced and it can be detached under much lower tensile force.

It is also possible to detach a structure comprising projections by some other deformation of the structures. This can be achieved for example by shear loading parallel to the adhesive face. The projections are deformed depending on their bending stiffness (E*I). As a result, the adhesion force is likewise reduced and the structure detached. Of importance here is not the shear strength of the adhesive bond but the fact that the deformation of the structures leads to the reduction in the adhesion force. Structures which can readily bend are readily detachable by this mechanism. The shear loading can be produced by an arbitrary movement parallel to the surface. This can be a linear movement or a rotation. The advantage of the detachment by shear loading lies in the fact that no pressure has to be exerted perpendicular to the adhesive face, as for triggering Euler buckling. However, such adhesive connections are susceptible to shear forces. The two faces can therefore also differ in their forces required for detachment, that is to say contact pressure for Euler buckling or shear loading for detachment.

In the case of the object according to the invention, the adhesive force of the two faces is preferably controlled in such a way that the adhesive force with normal adhesion of one face is higher than that of the other faces. As a result, upon contacting of the two faces of the object with two surfaces, the face with the smaller adhesion is preferentially detached again. The adhesive force present during detachment can be reduced for example by triggering the Euler buckling or shear loading.

The structure of at least one face is preferably chosen such that it can be released by a higher contact pressure, by Euler buckling. The adhesive force still present after the Euler buckling is preferably less than the adhesive force of the other structure. As a result, this face can be preferentially detached by triggering the Euler buckling.

In a preferred embodiment, the structure with the higher adhesive force is the structure which has the lower contact pressure for triggering the Euler buckling.

The same applies to detachment via shear loading. After the shear loading, the adhesive force of this face is preferentially less than that of the other face. As a result, this face is preferentially detached. Here, detachment via Euler buckling is preferred.

The adhesive force can also be influenced by the surface of the two faces that is available for adhesion, preferably by the projections present on the face. Here, the force for the collective buckling (Euler buckling) given the same load distribution is scaled linearly with the number of projections according to the following formula:

$$F=N(n\pi/L)^2 EI$$

where N stands for the number of projections. The structure can comprise only one projection. With preference, a structure according to the invention comprises at least 10 projections, particularly preferably at least 20, in particular at least 50 projections.

The structures are preferably ones which comprise a multiplicity of projections (pillars) which at least in each case have a stem and comprise an end face pointing away from the surface. It is with this end face that the projections come into contact with the surface to which they are intended to adhere.

What is to be understood by the perpendicular height of the end face is the distance of the end face from the surface on which the projections are arranged.

In a preferred embodiment of the invention, the projections of each structure of the invention are designed in the manner of columns. This means that the projections are ones which are preferably formed perpendicular to the surface and which have a stem and an end face, wherein the stem and the end face can have any desired cross section (for example circular, oval, rectangular, square, diamond-shaped, hexagonal, pentagonal, etc.).

The projections are preferably formed in such a way that the perpendicular geometric projection of the end face onto the base of the projection with the base forms an overlapping area, wherein the overlapping area and the geometric projection of the overlapping area onto the end face span a body which lies completely within the projection. In a preferred embodiment of the invention, the overlapping area covers at least 50% of the base, preferably at least 70% of the base, with, particularly preferably, the overlapping area covering the entire base. The projections are therefore preferably not inclined.

In a preferred embodiment, the end face is oriented parallel to the base and to the surface. If the end faces are not oriented parallel to the surface and therefore have different perpendicular heights, the average perpendicular height of the end face is considered to be the perpendicular height of the projection.

In one embodiment, the end face of the projections is greater than the base.

In a preferred embodiment of the invention, the stem of the projection has, with respect to its average diameter, an aspect ratio of height to diameter of 0.2 to 100, preferably of 0.5 to 20, particularly preferably between 2 and 5. The aspect ratio for at least one of the structures is preferably chosen in dependence on the structure and the material in such a way that the detachment by the Euler buckling is possible for a certain contact pressure. Here, an aspect ratio of 3 to 20, in particular of 3 to 10, very particularly of 5 to 10, is also preferred.

What is to be understood by the average diameter here is the diameter of the circle which has the same area as the corresponding cross section of the projection, averaged over the entire height of the projection.

The projections can have widened end faces, so-called mushroom structures.

In a preferred embodiment, the projections do not have widened end faces.

The end faces of the projections can themselves be structured in order to increase their surface. In this case, the average perpendicular height of the end face is considered to be the perpendicular height of the projections.

In a preferred embodiment, the perpendicular height of all projections lies in a range of 1 µm to 10 mm, preferably 1 µm to 5 mm, in particular 1 µm to 2 mm, preferably in a range from 10 µm to 2 mm.

In a preferred embodiment, the base corresponds in terms of area to a circle having a diameter between 0.1 µm and 5 mm, preferably 0.1 µm and 2 mm, particularly preferably between 1 µm and 500 µm, with particular preference between 1 µm and 100 µm. In one embodiment, the base is a circle having a diameter between 0.3 µm and 2 mm, preferably 1 µm and 100 µm.

The average diameter of the stems is preferably between 0.1 µm and 5 mm, preferably 0.1 µm and 2 mm, particularly preferably between 1 µm and 100 µm. The height and the average diameter are preferably adapted to correspond to the preferred aspect ratio.

In a preferred embodiment, in the case of widened end faces, the surface of the end face of a projection is at least 1.01 times, preferably at least 1.5 times, as large as the area of the base of a projection. It can be greater for example by the factor 1.01 to 20 or for example be 1.05 to 2 times greater.

In a further embodiment, the end face is between 5% and 100% greater than the base, particularly preferably between 10% and 50% of the base.

The widening of the end face of a projection means that such a projection is widened in the region of the end face. This widening, which is also associated with a widening of the diameter in the effected region, preferably relates only to the portion directly in front of the end face and the end face itself. It could thus be described as if a projection with a certain diameter at the end had placed thereon a flat body of small thickness, such as for example a disk on a cylinder. Here, the widening can also have a conical casing shape, with the result that the widening increases toward the end face. Here, in relation to the entire perpendicular height of a projection, the widening relates to at most 20% of the perpendicular height, preferably at most 10% of the perpendicular height, in particular at most 2% of the perpendicular height. The diameter without the widening is then used as relevant diameter for the Euler buckling.

In a preferred embodiment, the distance between two projections is less than 2 mm, in particular less than 1 mm.

The projections are preferably arranged periodically in a regular pattern.

The modulus of elasticity of the projections is preferably 50 kPa to 3 GPa. The modulus of elasticity is preferably 50 kPa to 5 GPa, in particular 100 kPa to 1 GPa, particularly preferably 500 kPa to 100 MPa. Whether a particularly high or low modulus of elasticity is advantageous can also depend on whether the corresponding structure is intended to be suitable for Euler buckling.

The structures on the opposite faces preferably differ at least in the contact pressure necessary for triggering the Euler buckling. The structures on the opposite faces preferably differ in at least one of the following properties selected from the structure, in particular number of projections, diameter and/or height, and modulus of elasticity. This also results in the variation of the contact pressure necessary for the Euler buckling. The difference can be adapted corresponding to the application.

With the same diameter and height, it is preferred for example if the ratio of the moduli of elasticity is greater than 2, preferably greater than 5, in order that the forces necessary for the buckling differ sufficiently.

The contact pressure required for triggering the Euler buckling preferably differs by at least the factor 2, preferably at least by the factor 5.

The materials of the projections can be freely selected by a person skilled in the art corresponding to the requirements. The projections can for example comprise the following materials:

epoxy- and/or silicone-based elastomers, thermoplastic elastomers (TPE), polyurethanes, epoxy resins, acrylate systems, methacrylate systems, polyacrylates as homo- and copolymers, polymethacrylates as homo- and copolymers (PMMA, AMMA acrylonitrile/methyl methacrylate), polyurethane (meth)acrylates, silicones, silicone resins, rubber, such as R rubber (NR natural rubber, IR polyisoprene rubber, BR butadiene rubber, SBR styrene-butadiene rubber, CR chloropropene rubber, NBR nitrile rubber) M rubber (EPM ethene-propene rubber, EPDM ethylene-propylene rubber), unsaturated polyester resins, formaldehyde resins, vinyl ester resins, polyethylenes as homo- or copolymers, and mixtures and copolymers of the aforementioned materials. Preference is also given to elastomers which are approved for use in the fields of packaging, pharmaceuticals and foods by the EU (in accordance with EU-VO no. October 2011 of Jan. 14, 2011, published on Jan. 15, 2011) or FDA, or silicone-free UV-curable resins from PVD and CVD processing technology. Here, polyurethane (meth) acrylates stands for polyurethane methacrylates, polyurethane acrylates, and mixtures and/or copolymers thereof.

Preference is given to thermoplastic elastomers (TPE), which can be based on different polymers, for example thermoplastic copolyamides (TPA), thermoplastic polyester elastomers/thermoplastic copolyesters (TPE), thermoplastic elastomers based on olefin (TPO), primarily PP/EPDM (PP: polypropylene), styrene block copolymers (TPS) such as SBS, SEBS, SEPS, SEEPS and MBS) or thermoplastic elastomers based on urethane (TPU), for example Elastollan, Desmopan, Texin or Utechllan, and thermoplastic vulcanizates (TPV).

Preference is given to epoxy- and/or silicone-based elastomers, polyurethane (meth)acrylates, polyurethanes, silicones, silicone resins (such as UV-curable PDMS), thermoplastic urethanes (TPU), polyurethane (meth)acrylates or rubber (such as EPM, EPDM).

In a preferred embodiment, the structures also have a backing layer on which the projections are arranged. This layer preferably consists of the same material as the projections.

The object itself can be manufactured from any desired materials. At least the two structures are arranged on its surface.

The two opposite structures are preferably arranged on two mutually parallel lateral faces of the object. The two structures each preferably cover over 50%, preferably over 70%, of the respective lateral face of the object.

In a preferred embodiment, the distance between the two lateral faces is less than the smallest diameter of the two surfaces covered by the structures, with the ratio of smallest diameter and distance preferably being at least 2:1.

In a further embodiment of the invention, the object is an adhesive pad which has, on both sides, in each case one of the aforementioned structures.

Both structures are preferably arranged in each case on the front and rear side of a flat body, preferably with a thickness of at least 0.1 mm, preferably at least 0.2 mm, in particular at least 0.5 mm. Depending on the desired application, the maximum thickness can be up to 2 cm, preferably up to 1 cm, in particular up to 6 mm.

The body preferably decouples the two structures arranged thereon, with the result that an Euler buckling of the one structure does not act on the other structure. This can be achieved for example by the thickness of the body and/or by its modulus of elasticity. For example, the two structures can be arranged on both sides of a plate made of a material having a modulus of elasticity higher by a factor>100, for example a plate made of plastic or metal.

The invention also relates to a method for the selective adhesion for an object according to the invention.

Individual method steps will be described in more detail below. The steps do not necessarily have to be carried out in the specified order, and the method to be described can also have further steps which are not stated.

In a first step, the first face is contacted with a first surface, and the second face is contacted with a second surface.

The entire face does not have to be contacted. A region large enough as is required for adhesion is contacted. It is therefore also possible for only parts of the faces to be contacted.

Where appropriate, the contacting can comprise pressing on in order to improve the adhesion, however without triggering of the Euler buckling.

The two contacted surfaces do not have to be the same size. It is also possible for a plurality of surfaces to be contacted at the same time on a face if, for example, a plurality of objects are intended to be simultaneously attached to the face by adhesion.

As a result of the contacting, an adhesive force forms between the faces and the respectively contacted surfaces.

The contacting preferably takes place in a perpendicular direction to the face and surface.

The main component of the adhesive force between a face and surface is preferably perpendicular to the face and surface (normal adhesion).

For detachment purposes, at least one of the contacted surfaces is moved away from the object until one of the two surfaces is detached from the object. The moving-away preferably occurs perpendicularly to the contacted faces. The movement can also be brought about by the movement of only one of the surfaces.

In a preferred embodiment, before the moving-away of the surfaces, the Euler buckling is additionally brought about for one of the structures by a contact pressure sufficient for said structure. As a result, the adhesive force of these faces is greatly reduced, which leads to the preferential detachment of the surface contacted on this face.

By suitable selection of the two faces, or of their structures, it is therefore possible to control which of the two surfaces is intended to be detached via the contact pressure exerted before the detachment.

As a result, it is possible for example to greatly simplify the handling of small articles. Thus, for example, the object according to the invention could be configured as an adhesive pad. A plunger or gripper contacts the first surface, and the object according to the invention thus adheres to the plunger or gripper, which can now contact articles with the other face of the object. If the adhesive force with respect to the articles is greater than the adhesive force with respect to the plunger or gripper, articles can be received and deposited in a simple manner. To detach the object according to the invention from plunger or gripper, a higher contact pressure can then be exerted such that Euler buckling occurs on the contact face to the plunger or gripper.

In another embodiment, the Euler buckling can be used for holding articles. Thus, the object according to the invention could adhere to one or more articles which are received by different plungers or grippers. The dry adhesive bonding to the objects is then greater than the bonding to the plunger or gripper. It is only with increased contact pressure and thereby induced Euler buckling that the articles are detached from the object according to the invention.

Further details and feature will emerge from the following description of preferred exemplary embodiments in conjunction with the dependent claims. Here, the respective features can be realized on their own or as a plurality in combination with one another. The possibilities of solving the problem are not limited to the exemplary embodiments. Thus, for example, range indications always comprise all—nonstated—intermediate values and all conceivable subintervals.

The exemplary embodiments are schematically illustrated in the figures. Identical reference signs in the individual figures here designate identical or functionally identical elements or elements which correspond to one another in terms of their functions. Specifically:

DETAILED DESCRIPTION OF THE DRAWINGS

Figure 1:
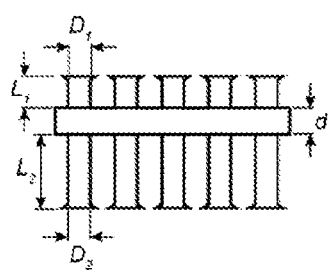
FIG. 1 shows a schematic illustration of an object having opposite structures which differ in the height (length) of the projections (example 1), the diameter (example 2) or the modulus of elasticity (example 3). Illustrated at the bottom is the side view of an object having two structures according to example 2 with $D_1=0.8$ mm and $D_2=0.4$ mm and also $L_1=L_2=1.6$ mm and $E_1=E_2=2$ MPa.
Figure 1:
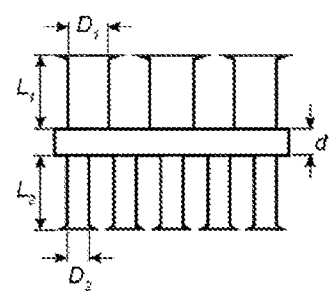
Figure 1:
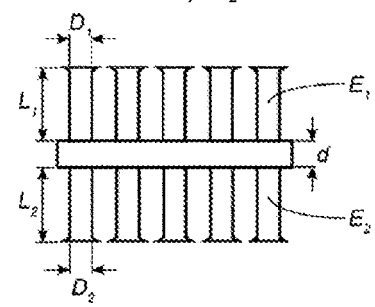
Figure 1:
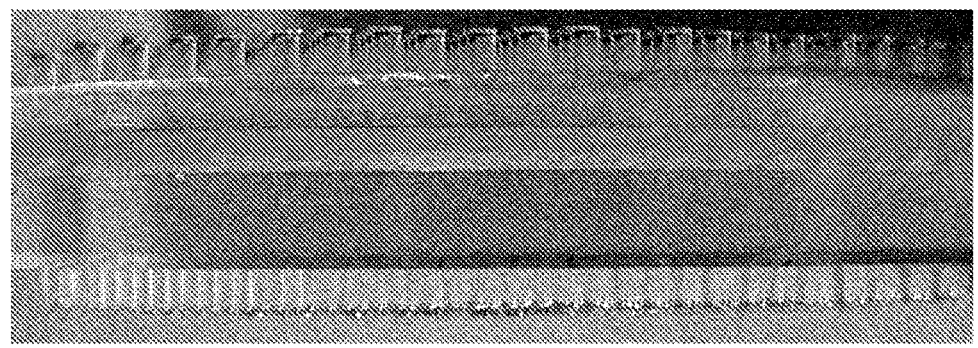

FIG. 1 shows, in the upper region, various examples of objects having two opposite structures which have column-like projections which in turn have slightly widened end faces (mushrooms). In example 1, the structures differ in the height of their projections ($L_1$ not equal to $L_2$). In example 2, the diameter of the projections differs ($D_1$ not equal to $D_2$). In example 3, the modulus of elasticity of the structures is different ($E_1$ not equal to $E_2$). These differences result in the fact that, in addition to different adhesive force, in particular the Euler buckling in the structures occurs under different forces.

Figure 2:
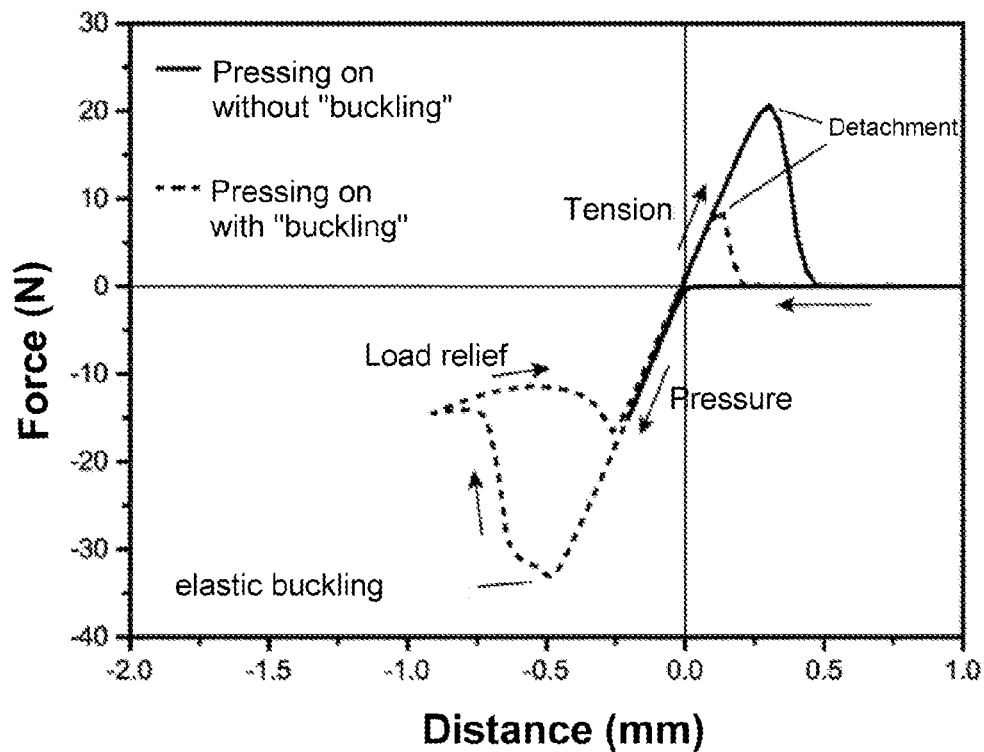
FIG. 2 shows an illustration of the measured force under loading and load relief (distance) of the structure shown in FIG. 1.

FIG. 2 shows the behavior of the object depicted in FIG. 1 (at the bottom) under different loading. For this purpose, the two structures of the object are contacted with a surface. If an external pressure is now exerted on the object perpendicular to the contact faces (contact pressure), the two structures are compressed (distance is negative). If the pressure is now reduced again, that is to say the contacted surfaces or one of the contacted surfaces move/moves away from the object, an adhesion force can be measured ("tension" in FIG. 2) until detachment of the object occurs. Which of the structures detaches depends on their adhesion force. This behavior is illustrated in FIG. 2 by the solid line.

If, during pressing on, the pressure now exceeds the limit for Euler buckling, there occurs elastic buckling and thus a reduction in the contact face of the buckling structure with the surface contacted on said structure. A decrease in the measured force during detachment of the surfaces occurs. The force to be applied is now considerably less, and the surface can be detached with considerably less force. Here, the structure for which the Euler buckling has been triggered is released.

Figure 3:
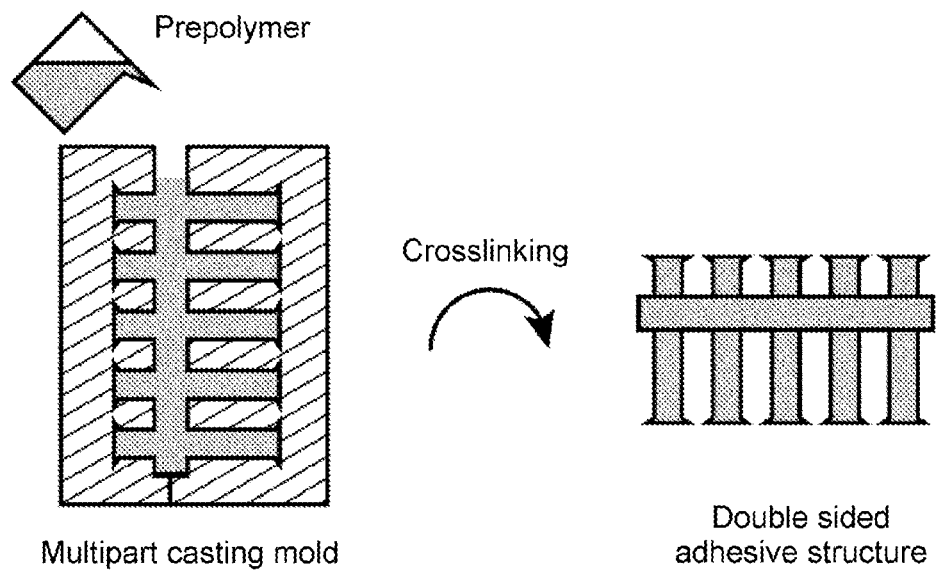
FIG. 3 shows a schematic illustration for producing the double-sided reversible adhesive structures.

FIG. 3 shows one possibility for producing double-sided adhesive structures. An uncrosslinked, liquid polymer (prepolymer) is poured into a multipart casting mold. The casting mold includes inserts which serve as a template (negative mold) for the adhesive structures. After crosslinking, the double-sided adhesive structure is removed from the mold.

Figure 4:
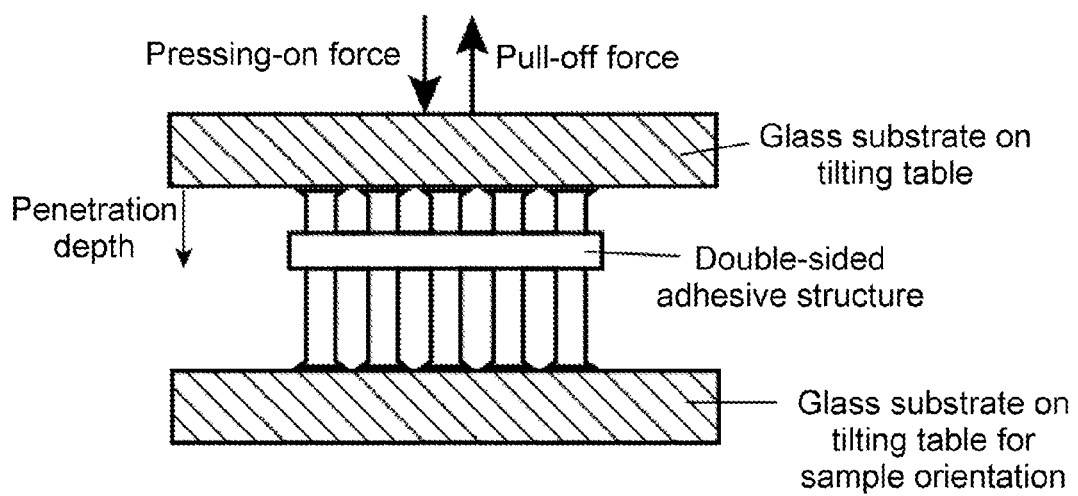
FIG. 4 shows an illustration of the measuring arrangement for determining the adhesion force as a function of the penetration depth.

FIG. 4 shows the measuring arrangement for determining the adhesion forces in dependence on the penetration depth. The adhesion is measured on both sides against glass substrates. A glass substrate (at the bottom) is mounted on a tilting table for orienting the adhesive surfaces with respect to the substrate surfaces. During the measurement, the upper substrate is brought into contact and pressed on to a defined penetration depth. Here, the pressing-on force (compressive force) is recorded. After the pressing on, the substrates are pulled apart and the adhesive force (tensile force) is determined.

Figure 5:
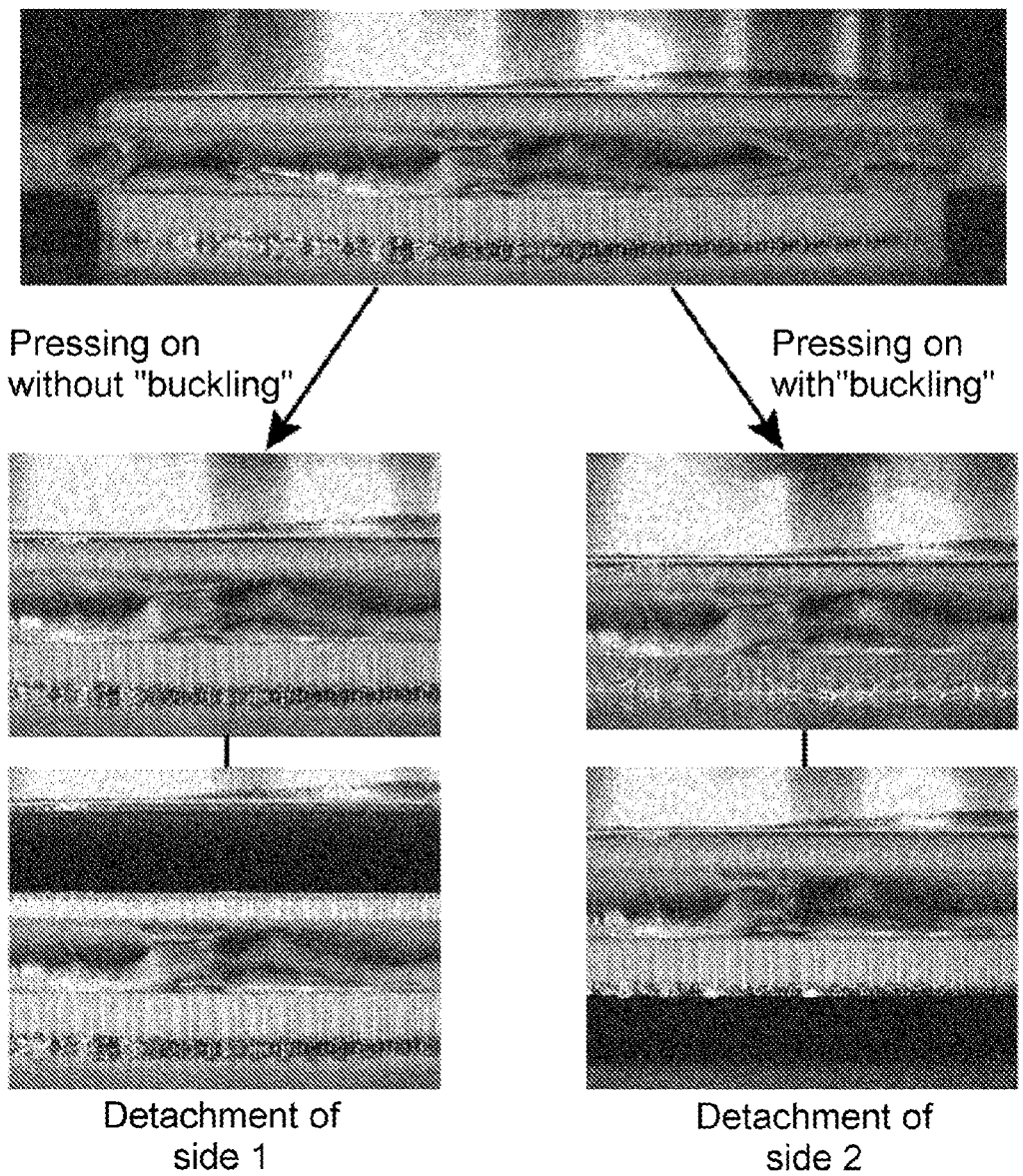
FIG. 5 shows the controlled detachment of the object according to the invention.

FIG. 5 shows how this principle can be used with the object of FIG. 1. Use is made of a structure according to example 1 of FIG. 1, that is to say the projections on the two sides differ in terms of their height. Upon contacting of the two structures, the contact pressure, also referred to as penetration depth) can be used to control for which of the two structures the detachment takes place (with identical contacted surfaces). In the case of a contact pressure which does not lead to Euler buckling (FIG. 5, left-hand column), the structure which has a smaller adhesive force is detached during the movement apart. It can be seen in the bottom drawing that the upper structure of the object has released. This is also the side which has the shorter projections. If, by contrast, a contact pressure is selected which leads to the Euler buckling in one of the structures, the adhesion for this structure decreases considerably, which leads to the preferential detachment of this structure (FIG. 5, right-hand column).

Figure 6:
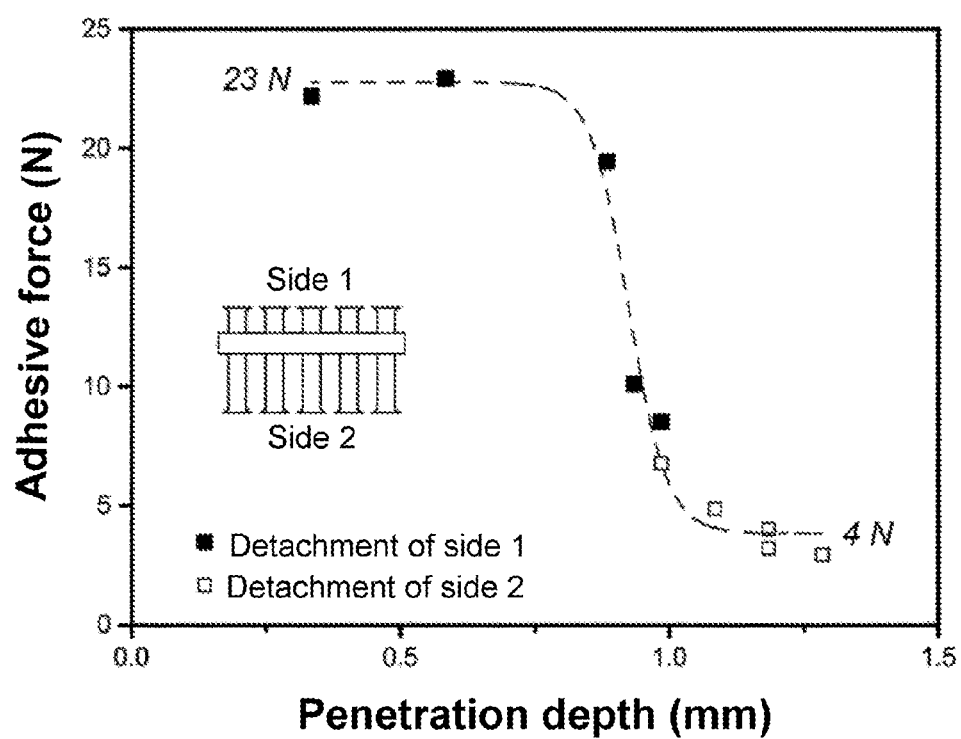
FIG. 6 shows the adhesive force as a function of a structure according to example 1 of FIG. 1.

FIG. 6 shows measurement values which have been obtained for an object according to example 1 of FIG. 1. The adhesive force has been measured in dependence on the penetration depth. In the case of small penetration depths, the double-sided structure is adhesive and, in the case of larger penetration depths, is low-adhesive. The detachment from the substrate changes from side 1 (filled boxes) to side 2 (unfilled boxes) with increasing penetration depth. Boxes correspond to experimental data. The dashed line corresponds to the fitted Sigmoid function for determining the asymptotic force values for the adhesive and low-adhesive range.

Figure 7:
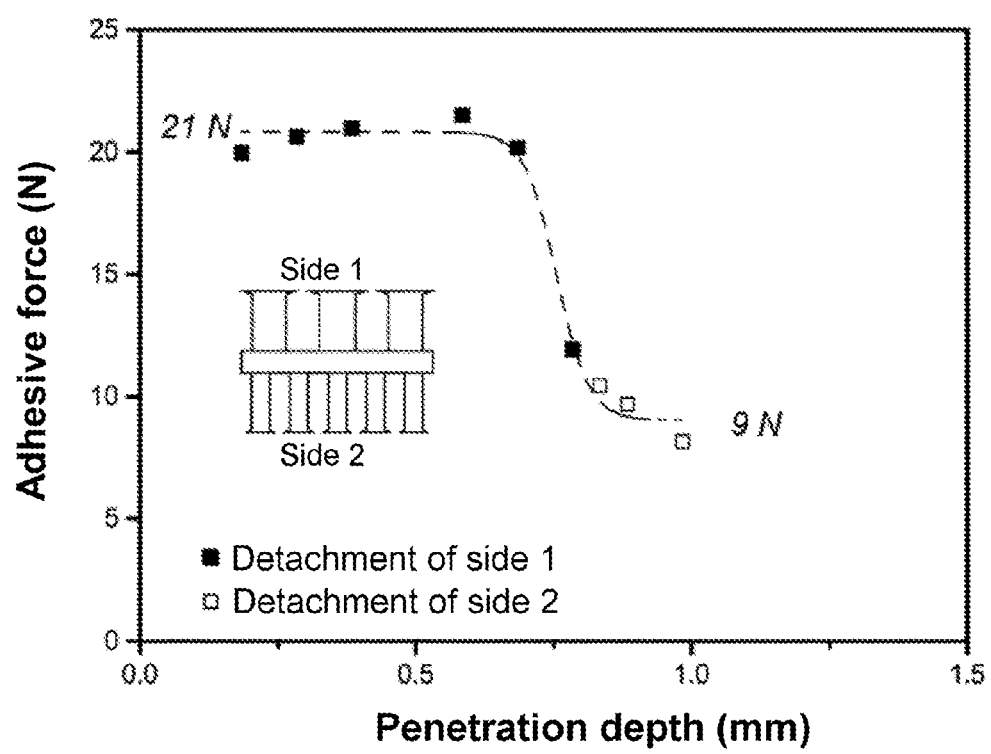
FIG. 7 shows the adhesive force as a function of a structure according to example 2 of FIG. 1.

FIG. 7 shows measurement values which have been obtained for an object according to example 2 of FIG. 1. The adhesive force has been measured in dependence on the penetration depth. In the case of small penetration depths, the double-sided structure is adhesive and, in the case of larger penetration depths, is low-adhesive. The detachment from the substrate changes from side 1 (filled boxes) to side 2 (unfilled boxes) with increasing penetration depth. Boxes correspond to experimental data. The dashed line corresponds to the fitted Sigmoid function for determining the asymptotic force values for the adhesive and low-adhesive range.

The switching efficiency of all investigated structure types is summarized in table 1. The adhesive tensions, $\sigma_{p,i}$, of both regimes (adhesive and low-adhesive) has been calculated from the asymptotic adhesive forces, $F_{p,i}$, (cf. FIGS. 6 and 7) and the contact face, A: $\sigma_{p,i} = F_{p,i}/A$.

The efficiency, S, results from $S = 1 - \sigma_{p,K}/\sigma_{p,0}$, where $\sigma_{p,0}$ is the adhesive tension without buckling (at small penetration depths) and $\sigma_{p,K}$ is the adhesive tension after the buckling of the structures (at high penetration depths). S can vary between 0 and 1, where 0 describes no switching behavior and 1 describes the maximum switching efficiency. The results in table 1 show that all double-sided adhesive structures have an efficiency of greater than 0.5, with some exemplary embodiments, with $S \approx 0.8$, having a very high switching efficiency. The thickness of the layer between the two switching structures has only minor influence on the switching efficiency in the examples.

Preference is given to systems having a switching efficiency of above 0.5, in particular above 0.7.

TABLE 1

|  | Adhesive tension without "buckling", $\sigma_{p,0}$ | Adhesive tension after "buckling", $\sigma_{p,K}$ | Switching efficiency, $S = 1 - \sigma_{p,K}/\sigma_{p,0}$ |
|---|---|---|---|
| Example 1 (d = 1 mm) | 28.0 kPa | 7.5 kPa | 0.73 |
| Example 1 (d = 2 mm) | 34.8 kPa | 6.0 kPa | 0.83 |

TABLE 1-continued

|  | Adhesive tension without "buckling", $\sigma_{p,0}$ | Adhesive tension after "buckling", $\sigma_{p,K}$ | Switching efficiency, $S = 1 - \sigma_{p,K}/\sigma_{p,0}$ |
|---|---|---|---|
| Example 1 (d = 3 mm) | 22.7 kPa | 10.6 kPa | 0.53 |
| Example 1 (d = 5 mm) | 28.1 kPa | 13.6 kPa | 0.52 |
| Example 2 (d = 1 mm) | 31.8 kPa | 13.5 kPa | 0.58 |
| Example 2 (d = 5 mm) | 33.3 kPa | 7.6 kPa | 0.77 |

The invention claimed is:

1. An object comprising:
   a body having at least on two surfaces, in each case a face capable of dry adhesion, wherein the two faces differ in at least one adhesion parameter,
   wherein each face is on an opposing side of the body and has a plurality of perpendicular projections, and
   wherein the plurality of perpendicular projections on one side of the body have a different modulus of elasticity than the plurality of perpendicular projections on an opposing side of the body.

2. The object as claimed in claim 1, wherein the adhesive force of the two faces is different.

3. The object as claimed in claim 1, wherein the perpendicular projections on the two faces differ in structure.

4. The object as claimed in claim 1, wherein at least one face has a structure whose adhesive force is reducible by Euler buckling or shear loading.

5. The object as claimed in claim 4, wherein the adhesive force resulting after the Euler buckling or shear loading is less than the adhesive force of the other face.

6. The object as claimed in claim 1, wherein the opposing sides of the body are opposing lateral sides that are parallel to one another.

7. The object as claimed in claim 1, wherein the perpendicular projections have an aspect ratio of height to diameter of 2 to 20.

8. The object as claimed in claim 1, wherein the body comprises a flat body having a thickness of 0.1 mm to 6 mm.

9. The object as claimed in claim 1, wherein the plurality of perpendicular projections on one side have a different diameter than the plurality of perpendicular projections on the opposing side.

10. The object as claimed in claim 1, wherein the plurality of perpendicular projections on one side have a different length than the plurality of perpendicular projections on the opposing side.

11. The object as claimed in claim 1, wherein a number of plurality of perpendicular projections on one side is different than a number of plurality of perpendicular projections on the opposing side.

12. The object as claimed in claim 1, wherein the plurality of perpendicular projections comprise a thermoplastic elastomer.

13. The object as claimed in claim 1, wherein each projection has a widened end face.

14. The object as claimed in claim 1, wherein the body is a plate made of plastic or metal.

15. A method for selective adhesion for an object as claimed in claim 1, comprising:

contacting a first face with a first substrate surface and contacting a second face with a second substrate surface;

moving at least one of the substrate surfaces away from the object until detachment of one of the two substrate surfaces.

16. The method as claimed in claim 15, wherein at least one of the faces has a structure and, before moving away the surfaces, Euler buckling is brought about by a sufficient contact pressure in one of the structures.

* * * * *